United States Patent
Hasegawa et al.

(10) Patent No.: US 7,336,453 B2
(45) Date of Patent: Feb. 26, 2008

(54) MAGNETIC SENSING ELEMENT INCLUDING PINNED LAYER AND/OR FREE LAYER COMPOSED OF [110] CRYSTAL PLANES-ORIENTED HEUSLER ALLOY

(75) Inventors: Naoya Hasegawa, Niigata-ken (JP); Masamichi Saito, Niigata-ken (JP); Yosuke Ide, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 673 days.

(21) Appl. No.: 10/953,647

(22) Filed: Sep. 29, 2004

(65) Prior Publication Data

US 2005/0074634 A1 Apr. 7, 2005

(30) Foreign Application Priority Data

Oct. 6, 2003 (JP) ............................. 2003-347354

(51) Int. Cl.
*G11B 5/127* (2006.01)
(52) U.S. Cl. .................. 360/324.12; 428/812; 428/816
(58) Field of Classification Search ............ 360/324.12
See application file for complete search history.

(56) References Cited

U.S. PATENT DOCUMENTS

| 5,114,800 A | * | 5/1992 | Shimizu et al. ............. 428/812 |
| 5,793,279 A | * | 8/1998 | Nepela ...................... 338/32 R |
| 6,205,008 B1 | | 3/2001 | Gijs et al. ................... 360/234 |
| 7,212,385 B2 | * | 5/2007 | Hayakawa ............... 360/324.2 |
| 2003/0035255 A1 | | 2/2003 | Hasegawa et al. ..... 360/324.11 |
| 2003/0197986 A1 | * | 10/2003 | Ambrose et al. ...... 360/324.11 |

FOREIGN PATENT DOCUMENTS

| EP | 0 827 220 | 6/1999 |
| JP | 8-250366 | 9/1996 |
| JP | 2002-319722 | 10/2002 |

OTHER PUBLICATIONS

Search Report dated Nov. 19, 2004 for British Patent Application No. 0421428.4.

* cited by examiner

*Primary Examiner*—Andrea Wellington
*Assistant Examiner*—Carlos E Garcia
(74) *Attorney, Agent, or Firm*—Brinks Hofer Gilson & Lione (57) ABSTRACT

A magnetic sensing element using a thin film composed of an adequately crystallized Heusler alloy is provided. At least one of free magnetic layer and pinned magnetic layer includes a Heusler alloy layer. The Heusler alloy layer has a body-centered cubic (bcc) structure, in which equivalent crystal planes represented as [220] planes are preferentially oriented in the direction parallel to the layer surface. The Heusler alloy layer is disposed on a bcc layer having a body-centered cubic (bcc) structure, in which equivalent crystal planes represented as [110] planes are preferentially oriented in the direction parallel to the layer surface.

15 Claims, 9 Drawing Sheets

MAGNETIC SENSING ELEMENT INCLUDING PINNED LAYER AND/OR FREE LAYER COMPOSED OF [110] CRYSTAL PLANES-ORIENTED HEUSLER ALLOY

This patent application claims the benefit of priority to Japanese Patent Application No. 2003-347354 filed on Oct. 6, 2003, herein incorporated by reference.

TECHNICAL FIELD

The present invention relates to a magnetic sensing element including a pinned magnetic layer in which the magnetization direction is pinned in one direction, a free magnetic layer, and a nonmagnetic layer disposed between the pinned magnetic layer and the free magnetic layer, and in particular, to a magnetic sensing element in which the amount of change in magnetoresistance can be increased.

BACKGROUND

Figure 10:
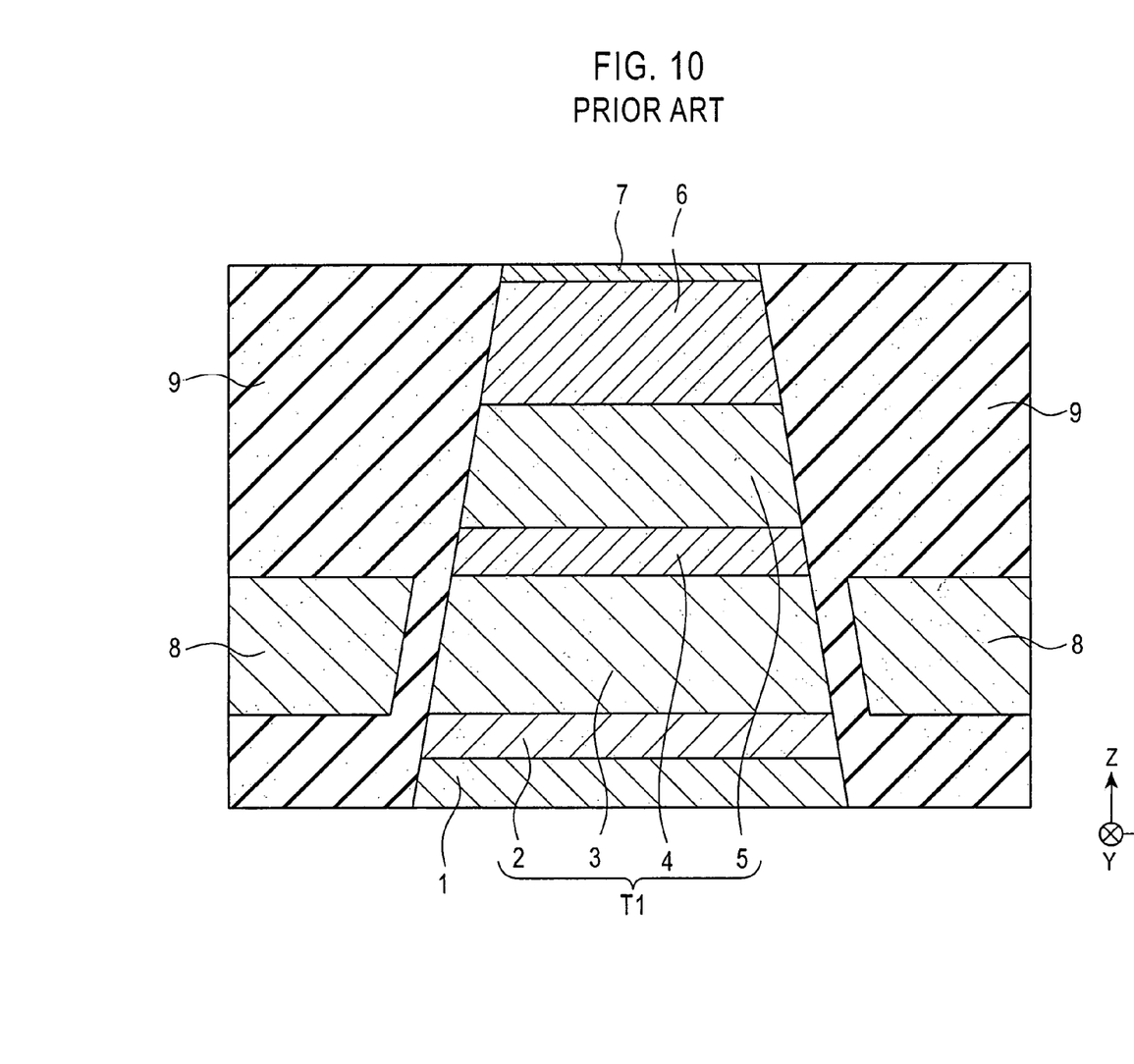
FIG. 10 is a cross-sectional view of a known magnetic sensing element, viewed from a surface facing a recording medium.

FIG. 10 is a partial cross-sectional view of a known magnetic sensing element, i.e., spin-valve thin film element, cut from the direction parallel to a surface facing a recording medium.

Referring to FIG. 10, a base layer 1 is composed of Ta, and a seed layer 2 composed of a metal having a body-centered cubic (bcc) structure, for example Cr, is disposed on the base layer 1.

A multilayer film T1 is deposited on the seed layer 2. In the multilayer film T1, a free magnetic layer 3, a nonmagnetic layer 4, a pinned magnetic layer 5, an antiferromagnetic layer 6, and a protective layer 7 are disposed in that order.

The free magnetic layer 3 is composed of a Heusler alloy such as $Co_2MoAl$, the nonmagnetic layer 4 is composed of Cu, the pinned magnetic layer 5 is composed of CoFe, the antiferromagnetic layer 6 is composed of PtMn, and the protective layer 7 is composed of Ta.

An exchange coupling magnetic field is generated at the interface between the antiferromagnetic layer 6 and the pinned magnetic layer 5, thereby pinning the magnetization of the pinned magnetic layer 5 in the height direction (in the Y direction in the figure).

Hard bias layers 8 composed of a hard magnetic material such as CoPt are disposed at each end of the free magnetic layer 3. The upper parts, the lower parts, and the ends of the hard bias layers 8 are insulated by an insulating layer 9. The magnetization of the free magnetic layer 3 is aligned in the track width direction (in the X direction in the figure) by a longitudinal bias magnetic field from the hard bias layers 8.

When an external magnetic field is applied to the magnetic sensing element shown in FIG. 10, the magnetization direction of the free magnetic layer 3 is relatively changed to that of the pinned magnetic layer 5. Consequently, the resistance of the multilayer film T1 is changed. Under a constant sense current, such a change in resistance is detected as the change in current or voltage of the sense current, thus detecting the external magnetic field.

The Heusler alloy, which is the material of the free magnetic layer, shows ferromagnetism depending on the composition. The term "Heusler alloy" is a generic term of metallic compounds having a Heusler crystal structure.

Japanese Unexamined Patent Application Publication No. 8-250366 discloses a magnetic sensing element including a thin film composed of a Heusler alloy. The thin film is disposed on a metal underlayer having the body-centered cubic (bcc) structure.

According to the above patent document, the thin film composed of a Heusler alloy is disposed on the metal underlayer having a bcc structure, and consequently, the thin film can be formed as an adequately crystallized film.

However, the above patent document specifically describes neither crystal orientations of the underlayer and the Heusler alloy film nor crystallographic matching relationship between the underlayer and the Heusler alloy film.

In addition to the crystal structure of the underlayer, which is disposed under Heusler alloy film, for example, the crystal orientation of the underlayer and the crystallographic matching between the Heusler alloy and the underlayer must be considered so that the Heusler alloy is formed as an adequately crystallized film.

The description in the above patent document does not provide specific conditions for producing a thin film composed of an adequately crystallized Heusler alloy. In reality, it may not be possible to produce such a thin film.

BRIEF SUMMARY

In order to solve the above problems, it is an object of the present invention to provide a magnetic sensing element using a thin film composed of an adequately crystallized Heusler alloy.

A magnetic sensing element of the present invention includes a multilayer film having at least one pinned magnetic layer in which the magnetization direction is pinned in one direction; a free magnetic layer; and at least one nonmagnetic layer disposed between the at least one pinned magnetic layer and the free magnetic layer, wherein a current flows in the direction perpendicular to the surface of the layers in the multilayer film. In the magnetic sensing element, at least one of the free magnetic layer and the pinned magnetic layer includes a Heusler alloy layer. The Heusler alloy layer has a body-centered cubic (bcc) structure, wherein equivalent crystal planes represented as [220] planes are preferentially oriented in the direction parallel to the surface of the layers in the multilayer film. The Heusler alloy layer is disposed on a bcc layer having a body-centered cubic (bcc) structure, wherein equivalent crystal planes represented as [110] planes are preferentially oriented in the direction parallel to the surface of the bcc layer.

According to the present invention, the Heusler alloy layer has a body-centered cubic (bcc) structure, in which equivalent crystal planes represented as [220] planes are preferentially oriented in the direction parallel to the layer surface. The Heusler alloy layer is deposited on a bcc layer having a body-centered cubic (bcc) structure, in which equivalent crystal planes represented as [110] planes are preferentially oriented in the direction parallel to the layer surface so that the Heusler alloy layer has an adequate Heusler crystal structure. The magnetoresistive element of the present invention includes the above layer structure, in which a current flows in the direction perpendicular to the surface of the layers in the multilayer film. The present inventors have found that the ratio of change in magnetoresistance can be improved in such a magnetoresistive element.

The reason for this is as follows: The [220] planes or the [110] planes in the bcc structure are the closest packed planes. As a result, diffusion of the atoms in the Heusler alloy layer into the bcc layer can be suppressed. After deposition, it is necessary that the Heusler alloy layer forms a superlattice by arranging the elements at fixed positions of the crystal lattices. When the Heusler alloy layer is deposited on the closest packed planes of the bcc layer, atoms in the Heusler alloy are readily moved in the direction parallel to the layer surface. Accordingly, the atomic positions are readily exchanged so as to form the superlattice.

Furthermore, even when the Heusler alloy layer is annealed after deposition to readily form the superlattice, interfacial diffusion between the Heusler alloy layer and the bcc layer can be minimized.

The term "Heusler alloy" is a generic term of metallic compounds having a Heusler crystal structure. Heusler alloys show ferromagnetism depending on the composition. The Heusler alloys are metals having a large spin-polarizability and are half-metals wherein most of the conduction electrons are composed of either only up-spin electrons or only down-spin electrons.

In the present invention, a Heusler alloy is used as the material of the free magnetic layer and/or the pinned magnetic layer in a CPP-GMR magnetic sensing element wherein a current flows in the direction perpendicular to the surface of the layers in the multilayer film. The magnetic sensing element according to the present invention provides the following advantage: The use of the Heusler alloy increases the change in spin diffusion length or the change in the mean free path of the conduction electrons in the magnetic sensing element. Such a change is based on the change in spin-dependent bulk scattering caused by the application of an external magnetic field. In other words, the use of the Heusler alloy increases the change in the resistance of the magnetic sensing element, thereby improving the detection sensitivity of the external magnetic field.

The bcc layer may be a sublayer forming at least a part of the free magnetic layer. The bcc layer may be a sublayer forming at least a part of the pinned magnetic layer. The bcc layer may be a seed layer disposed under the free magnetic layer.

The average grain size of the Heusler alloy layer in the direction parallel to the layer surface is preferably at least about 50 Å.

A columnar crystal is preferably formed, in which a crystal grain boundary formed in the bcc layer, the crystal grain boundary appearing in a cut surface in the direction parallel to the thickness of the bcc layer, and a crystal grain boundary formed in the Heusler alloy layer are continuous. In this case, grain boundary scattering of the conduction electrons can be decreased.

In particular, in the columnar crystal, the crystals of the bcc layer are preferably matched with the crystals of the Heusler alloy layer in an epitaxial state.

Preferably, when the crystals of the bcc layer are matched with the crystals of the Heusler alloy layer, equivalent crystal axes lying in the [110] planes or the [220] planes of the columnar crystal are directed in the same direction between the bcc layer and the Heusler alloy layer.

The Heusler alloy layer may be composed of, for example, a metallic compound having a Heusler crystal structure and represented by a composition formula $X_2YZ$ or XYZ, wherein X is at least one element selected from Cu, Co, Ni, Rh, Pt, Au, Pd, Ir, Ru, Ag, Zn, Cd, and Fe; Y is at least one element selected from Mn, Fe, Ti, V, Zr, Nb, Hf, Ta, Cr, Co, and Ni; and Z is at least one element selected from Al, Sn, In, Sb, Ga, Si, Ge, Pb, and Zn.

The Heusler alloy layer is preferably composed of a metallic compound represented by a composition formula $X_2MnZ$, wherein X is at least one element selected from Cu, Co, Ni, Au, and Pd; and Z is at least one element selected from Al, Sn, In, Sb, Ga, Si, and Ge.

The Heusler alloy layer is more preferably composed of a metallic compound represented by a composition formula $Co_2MnZ$, wherein Z is at least one element selected from Al, Sb, Si, and Ge.

In the present invention, the multilayer film may further include at least one antiferromagnetic layer. The at least one pinned magnetic layer may be formed in contact with the at least one antiferromagnetic layer, and the magnetization direction of the at least one pinned magnetic layer may be pinned by the exchange anisotropic magnetic field with the at least one antiferromagnetic layer.

In the present invention, one nonmagnetic layer may be disposed on the free magnetic layer, another nonmagnetic layer may be disposed under the free magnetic layer, one pinned magnetic layer may be disposed on the nonmagnetic layer, and another pinned magnetic layer may be disposed under the other nonmagnetic layer.

In this case, the multilayer film may further include an antiferromagnetic layer disposed on the pinned magnetic layer and another antiferromagnetic layer disposed under the other pinned magnetic layer. The antiferromagnetic layers may pin the magnetization direction of each pinned magnetic layer in one direction by the exchange anisotropic magnetic field.

According to the present invention, the Heusler alloy layer has the bcc structure, in which equivalent crystal planes represented as [220] planes are preferentially oriented in the direction parallel to the surface of the multilayer film having the pinned magnetic layer and the free magnetic layer. The Heusler alloy layer is disposed on the bcc layer having the body-centered cubic (bcc) structure, in which equivalent crystal planes represented as [110] planes are preferentially oriented in the direction parallel to the layer surface. This layer structure facilitates the change in the atomic positions to form the superlattice of the Heusler alloy layer. As a result, a Heusler alloy layer having an adequate Heusler crystal structure can be formed, and in addition, the ratio of change in magnetoresistance of the magnetic sensing element can be improved.

According to the present invention, the use of a Heusler alloy as the material of the free magnetic layer and/or the pinned magnetic layer in the CPP-GMR magnetic sensing element particularly has the following advantage: The use of a Heusler alloy increases the change in spin diffusion length or the change in the mean free path of the conduction electrons in the magnetic sensing element, the change being caused by applying an external magnetic field. In other words, the use of the Heusler alloy increases the change in the resistance of the magnetic sensing element, thereby improving the detection sensitivity of the external magnetic field.

DETAILED DESCRIPTION OF THE PREFERRED EMBODIMENTS

First Embodiment

Figure 1:
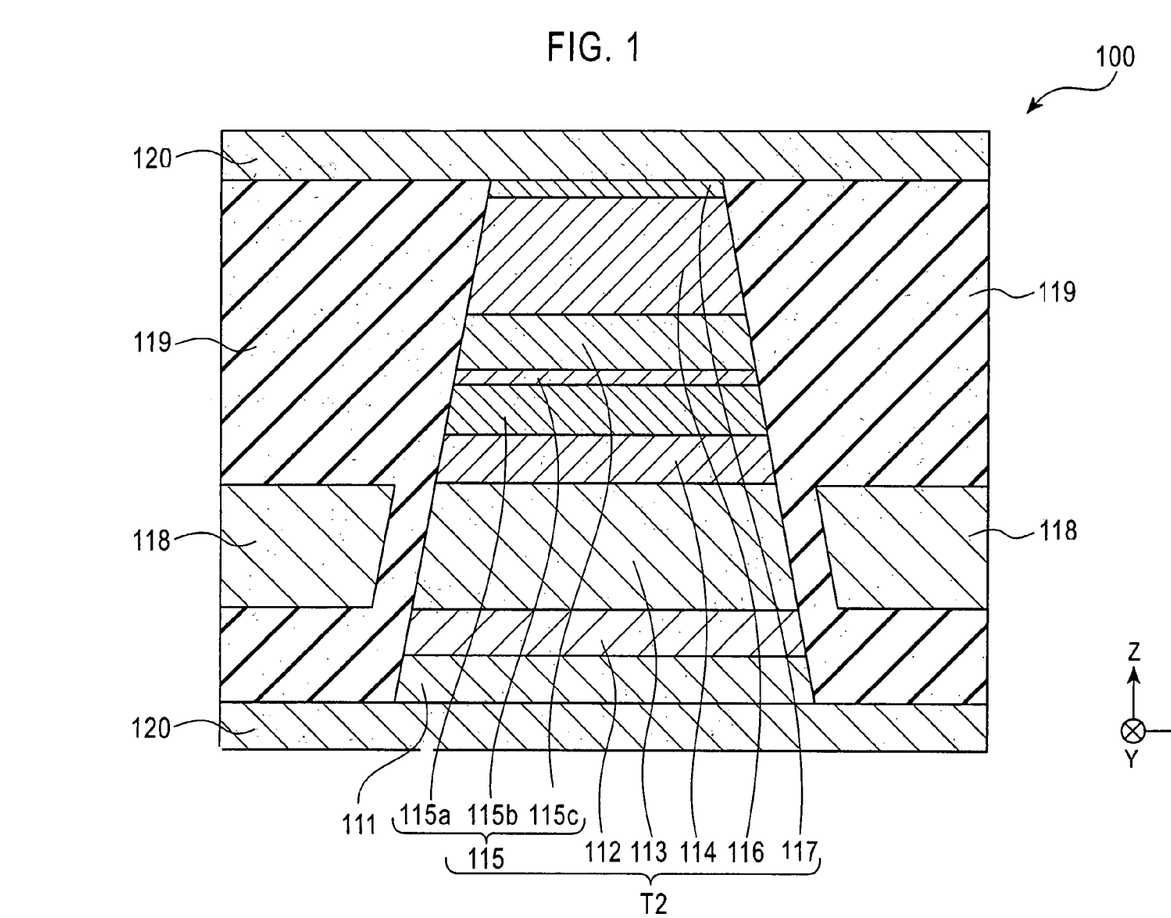
FIG. 1 is a cross-sectional view of a magnetic sensing element according to a first embodiment of the present invention, viewed from a surface facing a recording medium.

FIG. 1 is a cross-sectional view of an overall structure of a magnetic sensing element 100 (single spin-valve magnetoresistive element) according to a first embodiment of the present invention, viewed from a surface facing a recording medium. FIG. 1 shows only the central portion of the sensing element expanding in the X direction.

For example, this single spin-valve magnetoresistive element 100 is mounted at the trailing edge of a floating slider installed in a hard disk device to detect magnetic fields recorded on a hard disk. A magnetic recording medium such as a hard disk moves in the Z direction, and the leakage magnetic field from the magnetic recording medium is in the Y direction.

Referring to FIG. 1, a base layer 111 is composed of a nonmagnetic material, for example, at least one element selected from Ta, Hf, Nb, Zr, Ti, Mo, and W. A multilayer film T2 is deposited on the base layer 111. The multilayer film T2 includes a seed layer 112, a free magnetic layer 113, a nonmagnetic layer 114, a pinned magnetic layer 115, an antiferromagnetic layer 116, and a protective layer 117. The magnetic sensing element 100 shown in FIG. 1 is a top spin-valve GMR magnetic sensing element in which the antiferromagnetic layer 116 is disposed on the pinned magnetic layer 115.

The seed layer 112, which has a bcc structure, corresponds to a bcc layer of the present invention. The free magnetic layer 113 disposed on the seed layer 112 is composed of a Heusler alloy having a bcc structure. This free magnetic layer 113 corresponds to a Heusler alloy layer of the present invention.

The nonmagnetic layer 114 is composed of Cu. The nonmagnetic layer 114 composed of Cu has a face-centered cubic (fcc) structure, wherein crystallographically equivalent planes represented as [111] planes are preferentially oriented in the direction parallel to the layer surface.

The pinned magnetic layer 115 has a triple layer structure including a second magnetic sublayer 115a, a nonmagnetic interlayer 115b, and a first magnetic sublayer 115c. The second magnetic sublayer 115a is magnetized in the direction antiparallel to the magnetization direction of the first magnetic sublayer 115c by the exchange coupling magnetic field generated at the interface with the antiferromagnetic layer 116 and by the antiferromagnetic exchange coupling magnetic field (Ruderman-Kittel-Kasuya-Yoshida interaction, i.e., RKKY interaction) through the nonmagnetic interlayer 115b. This antiparallel state, which is known as a synthetic ferrimagnetic coupling state, can stabilize the magnetization of the pinned magnetic layer 115 and increase the apparent exchange coupling magnetic field generated at the interface between the pinned magnetic layer 115 and the antiferromagnetic layer 116.

Alternatively, the pinned magnetic layer 115 may be formed as a single layer composed of a magnetic layer or as a multilayer composed of magnetic sublayers.

The second magnetic sublayer 115a and the first magnetic sublayer 115c are composed of a ferromagnetic material such as CoFe or NiFe.

For example, the second magnetic sublayer 115a has a thickness of about 20 to about 50 Å, the nonmagnetic interlayer 115b has a thickness of about 8 to about 10 Å, and the first magnetic sublayer 115c has a thickness of about 15 to about 35 Å.

The nonmagnetic interlayer 115b is composed of a nonmagnetic conductive material such as Ru, Rh, Ir, Cr, Re, or Cu.

The antiferromagnetic layer 116 is preferably composed of an antiferromagnetic material containing X and Mn, wherein X is at least one element selected from Pt, Pd, Ir, Rh, Ru, and Os.

These X—Mn alloys containing an element of the platinum group are excellent as antiferromagnetic materials because they have superior corrosion resistance and high blocking temperatures and can generate large exchange coupling magnetic fields ($H_{ex}$). In particular, platinum (Pt) is preferably used among the elements of the platinum group. For example, a binary PtMn alloy is used.

According to the present invention, the antiferromagnetic layer 116 may be composed of an antiferromagnetic material containing X, X', and Mn, wherein X' is at least one element selected from Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and rare earth elements.

The following element or elements are preferably used as X': An element or elements enter the interstices in the space lattice formed by X and Mn to form an interstitial solid solution. Alternatively, the element or elements partially replace lattice points of the crystal lattice formed by X and Mn to form a substitutional solid solution. Herein, the term "solid solution" refers to a solid in which its components are homogeneously mixed over wide ranges.

The interstitial or substitutional solid solution composed of the X—Mn—X' alloy has a larger lattice constant compared with that of the X—Mn alloy layer. As a result, the difference between the lattice constant of the antiferromagnetic layer 116 and that of the pinned magnetic layer 115 can be increased so that the boundary structure between the antiferromagnetic layer 116 and the pinned magnetic layer 115 are readily mismatched. Herein, a term "mismatched state" refers to a state in which atoms in the antiferromagnetic layer 116 and the atoms in the pinned magnetic layer 115 do not generate one-to-one correspondence at the interface between the antiferromagnetic layer 116 and the pinned magnetic layer 115.

In particular, when an element or elements that form a substitutional solid solution are used as X', an excessive X' content deteriorates the antiferromagnetic property and decreases the magnitude of the exchanging coupling magnetic field generated at the interface with the pinned magnetic layer 115. According to the present invention, at least one inert rare gas element selected from Ne, Ar, Kr, and Xe that forms an interstitial solid solution is preferably used as X'. Rare gas element are inert, therefore, even when the layer includes these rare gas elements, the rare gases barely affect the antiferromagnetic properties. For example, argon (Ar), which is often introduced in sputtering apparatuses as a sputtering gas, can readily enter the layer by simply optimizing the gas pressure.

When a gaseous element or elements are used as X', a high content of X' in the layer is difficult to achieve. However, even a small amount of the rare gas contained in the layer significantly increases the exchange coupling magnetic field generated by annealing.

According to the present invention, the X' content is preferably in the range of about 0.2 to about 10 atomic percent, and more preferably, in the range of about 0.5 to about 5 atomic percent. According to the present invention, the element represented by X is preferably Pt, and therefore, an alloy composed of Pt—Mn—X' is preferably used.

According to the present invention, the X content or the X+X' content in the antiferromagnetic layer 116 is preferably in the range of about 45 to about 60 atomic percent, and more preferably, in the range of about 49 to about 56.5 atomic percent. In this case, the interface with the pinned magnetic layer 115 is put into the mismatched state during deposition, and the antiferromagnetic layer 116 can achieve an adequate order transformation by annealing.

In the magnetic sensing element 100 shown in FIG. 1, hard bias layers 118 are disposed at each end of the free magnetic layer 113. The magnetization of the free magnetic layer 113 is aligned in the track width direction (in the X direction in the figure) by a longitudinal bias magnetic field from the hard bias layers 118. For example, the hard bias layers 118 are composed of a cobalt-platinum (Co—Pt) alloy or a cobalt-chromium-platinum (Co—Cr—Pt) alloy.

The upper parts, the lower parts, and the ends of the hard bias layers 118 are insulated by an insulating layer 119 composed of, for example, alumina.

Electrode layers 120 are disposed on and under the multilayer film T2. The magnetic sensing element of the present embodiment is a current perpendicular to the plane-giant magnetoresistive (CPP-GMR) magnetic sensing element in which a sense current flows in the direction perpendicular to the surface of each layer in the multilayer film T2.

For example, the electrode layers 120 are composed of α-Ta, Au, Cr, Cu, Rh, Ir, Ru, or W.

In preparation of the spin-valve magnetic sensing element 100 shown in FIG. 1, the layers are sequentially deposited from the base layer 111 up to the protective layer 117, and the layers are then annealed so as to generate the exchange coupling magnetic field at the interface between the antiferromagnetic layer 116 and the pinned magnetic layer 115. During annealing, magnetization of the pinned magnetic layer 115 is pinned in the Y direction in the figure by applying a magnetic field in the Y direction. In the embodiment shown in FIG. 1, the pinned magnetic layer 115 has a laminated ferrimagnetic structure. Therefore, for example, when the first magnetic sublayer 115c is magnetized in the Y direction in the figure, the second magnetic sublayer 115a is magnetized in the direction opposite to the Y direction.

In the magnetic sensing element 100 shown in FIG. 1, the magnetization direction of the pinned magnetic layer 115 is orthogonal to that of the free magnetic layer 113. A leakage magnetic field from a recording medium enters the magnetic sensing element 100 in the Y direction in the figure. The magnetization of the free magnetic layer 113 is sensitively changed in response to the magnetic field. The electrical resistance is changed according to the relationship between the above change in the magnetization direction and the pinned magnetization direction of the pinned magnetic layer 1115. The leakage magnetic field from the recording medium is detected by changes in voltage or current based on the change in the electrical resistance.

The base layer 111 is formed in order that equivalent crystal planes represented as [110] planes of the seed layer 112, which is formed on the base layer 111, are preferentially oriented in the direction parallel to the surface of the multilayer film T2. The base layer 111 has a thickness of, for example, about 50 Å.

The seed layer 112, which has the bcc structure, corresponds to the bcc layer of the present invention. In the seed layer 112, equivalent crystal planes typically represented as [110] planes are preferentially oriented in the direction parallel to the surface of the multilayer film T2. The seed layer 112 is preferably composed of Cr, V, Nb, Mo, Ta, W, or an alloy thereof.

Herein, the phrase "equivalent crystal planes typically represented as [110] planes" refers to crystal lattice planes represented in terms of Miller indices. The equivalent crystal planes represented as [110] planes include the (110) plane, the (—110) plane, the (1-10) plane, the (—1-10) plane, the (101) plane, the (—101) plane, the (10-1) plane, the (—10-1) plane, the (011) plane, the (0-11) plane, the (01-1) plane, and the (0-1-1) plane.

According to the present invention, in the seed layer 112, the (110) plane and the other equivalent planes are preferentially oriented in the direction parallel to the surface of the multilayer film T2.

As described above, in the magnetic sensing element 100 shown in FIG. 1, the free magnetic layer 113, which is a Heusler alloy layer, is disposed on the seed layer 112. The seed layer 112 is formed so that equivalent crystal planes typically represented as [110] planes are preferentially oriented in the direction parallel to the surface of the multilayer film T2. As a result, in the free magnetic layer 113 disposed on the seed layer 112, equivalent crystal planes typically represented as [220] planes are preferentially oriented in the direction parallel to the surface of the multilayer film T2.

Herein, the phrase "equivalent crystal planes typically represented as [220] planes" refers to crystal lattice planes represented in terms of Miller indices. The equivalent crystal planes represented as [220] planes include the (220) plane, the (−220) plane, the (2-20) plane, the (−2-20) plane, the (202) plane, the (−202) plane, the (20-2) plane, the (-20-2) plane, the (022) plane, the (0-22) plane, the (2-2) plane, and (0-2-2) plane.

In the free magnetic layer 113 of the magnetic sensing element 100, the (220) plane and the other equivalent planes are preferentially oriented in the direction parallel to the surface of the multilayer film T2.

In the seed layer 112 of the present invention, crystal planes preferentially oriented in the direction parallel to the layer surface are preferably equivalent crystal planes typically represented as [110] planes. In the free magnetic layer 113 of the present invention, crystal planes preferentially oriented in the direction parallel to the layer surface are preferably equivalent crystal planes typically represented as [220] planes. The reason is that the [220] planes or the [110] planes in the bcc structure are the closest packed planes. As a result, diffusion of the atoms in the Heusler alloy layer into the bcc layer can be suppressed. After deposition, it is necessary that the Heusler alloy layer forms a superlattice by arranging the elements at fixed positions of the crystal lattices. When the Heusler alloy layer is deposited on the closest packed planes of the bcc layer, atoms in the Heusler alloy are readily moved in the direction parallel to the layer surface. Accordingly, the atomic positions are readily exchanged so as to form the superlattice. Furthermore, even when the Heusler alloy layer is annealed after deposition to readily form the superlattice, interfacial diffusion between the Heusler alloy layer and the bcc layer can be minimized.

Figure 4:
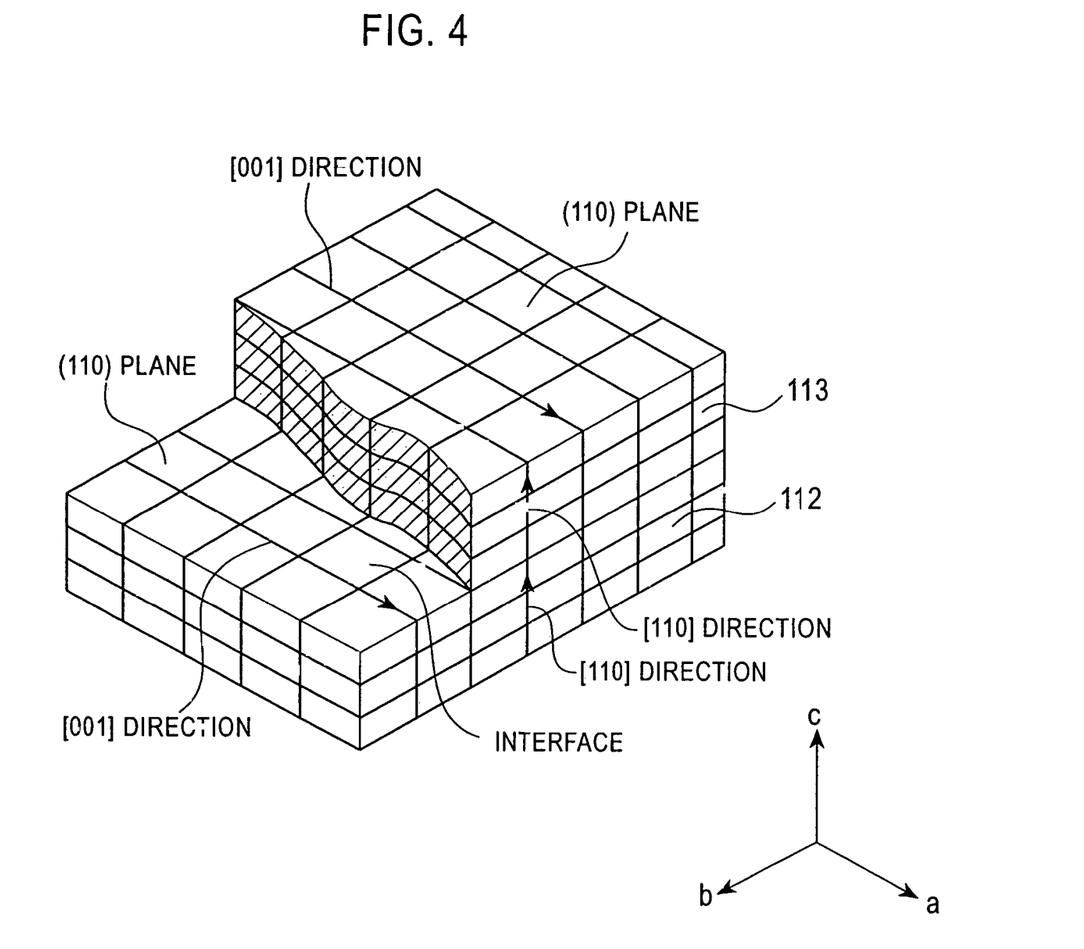
FIG. 4 is a schematic view showing crystal orientations of a seed layer and a free magnetic layer.

Furthermore, according to the present invention, crystallographically equivalent axes lying in the above crystal planes are, at least partly, directed in the same direction between the seed layer 112 and the free magnetic layer 113 (See FIG. 4). For example, referring to FIG. 4, the <011>direction lying in the (110) plane of the seed layer 112 and the <001>direction lying in the (110) plane of the free magnetic layer 113 are the same direction.

The generation of such a crystal orientation depends on the conditions for the deposition of the seed layer 112 and the free magnetic layer 113.

The free magnetic layer 113 is preferably deposited on the seed layer 112 such that the free magnetic layer 113 is matched with the seed layer 112 in an epitaxial state. In order to achieve this, atoms of the free magnetic layer 113 must have energy for adequately moving on the seed layer 112 so that after reaching the seed layer 112, the atoms sputtered from a target substrate, which are the material of the free magnetic layer 113, can be rearranged according to the atomic arrangement of the seed layer 112.

In order to increase the energy of the atoms of the free magnetic layer 113, optimizing the sputtering gas pressure to sputter the target is important. An excessively high sputtering gas pressure increases collision frequency between the atoms of the free magnetic layer 113 and the sputtering gas molecules. Consequently, the atoms which become the material of the free magnetic layer 113 lose their energy before reaching the seed layer 112. Therefore, the sputtering gas pressure is preferably low, but an excessively low sputtering gas pressure prevents stable electrical discharge.

Accordingly, the sputtering gas pressure to sputter the target is preferably about $5\times10^{-5}$ Torr ($6.7\times10^{-3}$ Pa) to about $3\times10^{-3}$ Torr (0.4 Pa). In the present embodiment, argon is used as the sputtering gas with a sputtering gas pressure of about $1.5\times10^{-3}$ Torr (0.2 Pa).

When the temperature of a substrate having the seed layer 112 thereon is increased, the atoms, which are sputtered on the seed layer 112 from the target and become the material of the free magnetic layer 113, readily move on the seed layer 112 and are readily rearranged according to the atomic arrangement of the seed layer 112. However, an excessively high temperature of the substrate having the seed layer 112 is not preferable because interdiffusion of the atoms at the interface between the seed layer 112 and the free magnetic layer 113 occurs to a significant degree.

Accordingly, the temperature of the substrate having the seed layer 112 is preferably from about 0° C. to about 100° C. In the present embodiment, the temperature of the substrate is kept at about 30° C. to about 40° C. by water-cooling.

When reaching the seed layer 112, the atoms which become the material of the free magnetic layer 113 preferably have a large amount of energy. In order to increase the energy, the distance between the target and the substrate having the seed layer 112 is preferably small so as to decrease the collision frequency between the atoms which become the material of the free magnetic layer 113 and the sputtering gas molecules. However, an excessively small distance between the target and the substrate having the seed layer 112 is not preferable. The temperature of the substrate having the seed layer 112 is excessively increased by secondary electrons from the target and radiation heat. As a result, interdiffusion of the atoms at the interface between the seed layer 112 and the free magnetic layer 113 occurs to a significant degree. Furthermore, in an excessively small distance between the target and the substrate having the seed layer 112, it is difficult to deposit the free magnetic layer 113 having uniform thickness.

Accordingly, the distance between the target and the substrate having the seed layer 112 is preferably from about 50 to about 300 mm. In the present embodiment, the distance between the target and the substrate having the seed layer 112 is about 89 mm.

When the crystals of the seed layer 112 (i.e., the bcc layer) are matched with the crystals of the free magnetic layer 113 (i.e., the Heusler alloy layer), equivalent crystal axes lying in the (110) plane or the (220) plane of a columnar crystal are directed in the same direction between the bcc layer and the Heusler alloy layer. When the free magnetic layer 113 is deposited on the seed layer 112 in an epitaxial state, all crystal orientations in the free magnetic layer 113 readily become parallel to those in the seed layer 112. At the interface between the free magnetic layer 113 and the seed layer 112, the above equivalent crystal planes are preferentially oriented in the direction parallel to the interface. In addition, equivalent crystal axes lying in the above crystal planes are directed in the same direction between the free magnetic layer 113 and the seed layer 112. As a result, the atomic arrangement in the free magnetic layer 113 and the atomic arrangement in the seed layer 112 readily generate one-to-one correspondence at the interface between the free magnetic layer 113 and the seed layer 112 (See FIG. 4).

In this manner, the crystals of the seed layer 112 are matched with the crystals of the free magnetic layer 113. On the other hand, if the crystals of the seed layer 112 are not matched with those of the free magnetic layer 113, the interface between the seed layer 112 and the free magnetic layer 113 is in the same state in which a crystal grain boundary is generated. Consequently, at the interface, conduction electrons are subjected to interface scattering, which is similar to the grain boundary scattering. This interface scattering increases the resistance and decreases the ratio of change in resistance ($\Delta R/R$).

In the present invention, a crystal grain boundary of the seed layer 112 appearing in a cut surface in the direction parallel to the layer thickness and a crystal grain boundary of the free magnetic layer 113 are, at least partly, continuous at the interface between the seed layer 112 and the free magnetic layer 113.

The term "crystal grain boundary" in the present invention refers to a boundary in which two crystal grains are in contact with each other while maintaining the different crystal orientations.

Figure 5:
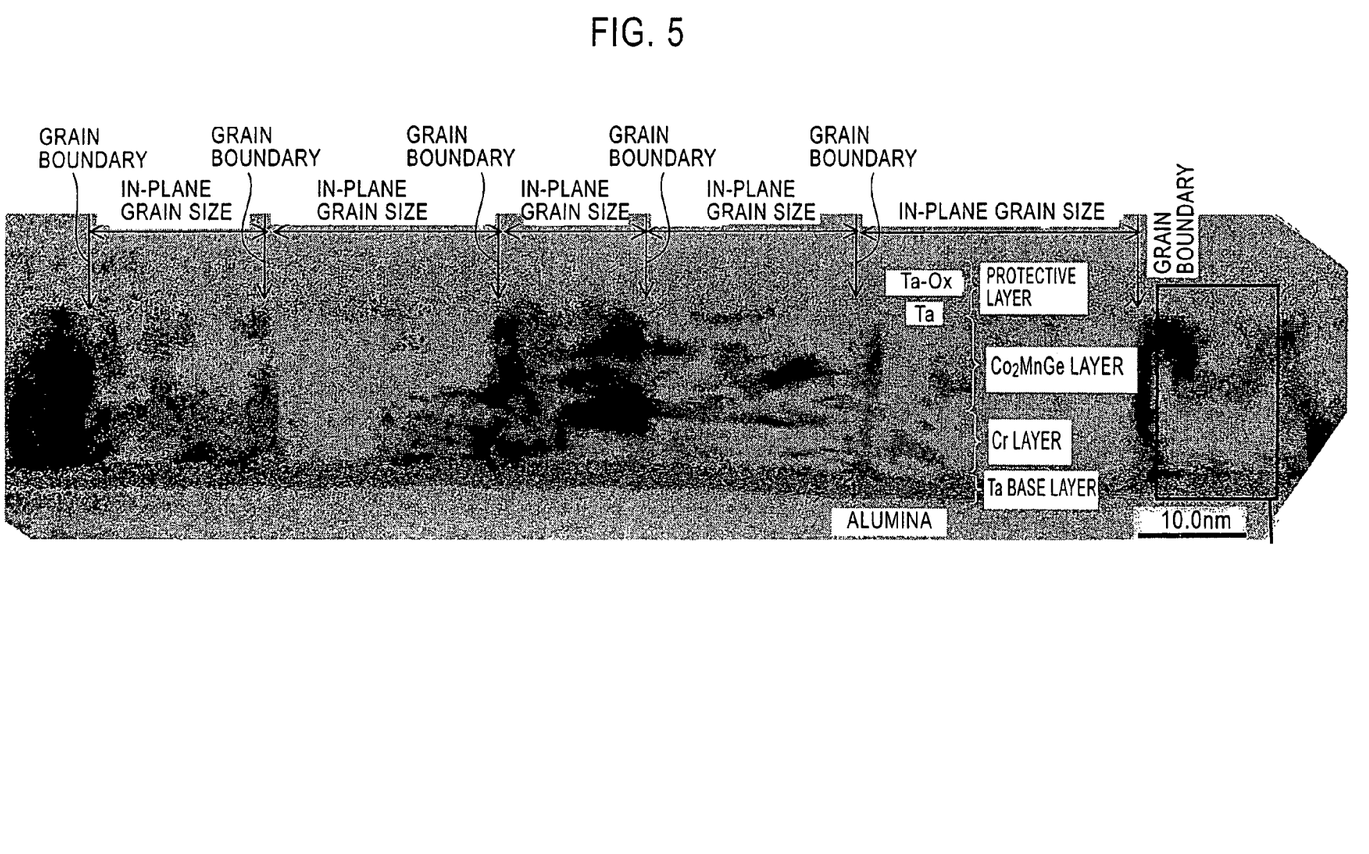
FIG. 5 is a transmission electron microscope image of a spin-valve thin film element in accordance with an embodiment of the present invention, viewed from the cut surface in the direction parallel to the film thickness.
Figure 6:
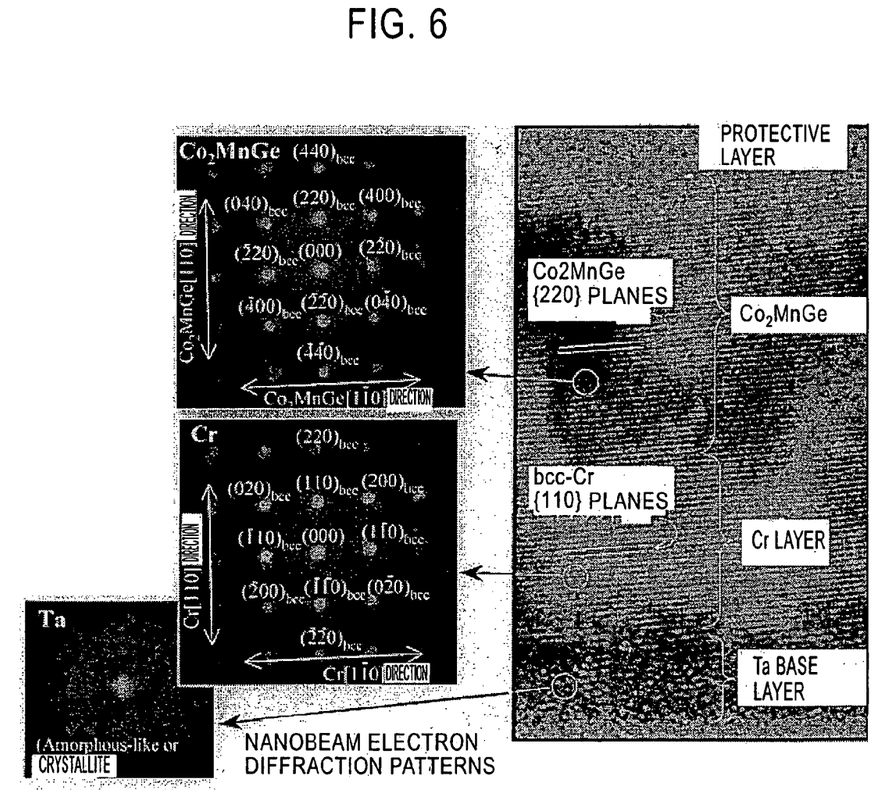
FIG. 6 is a partial enlarged view of FIG. 5 and transmission electron diffraction patterns of a base layer, a seed layer, and a free magnetic layer, analyzed from the direction parallel to the interface.
Figure 7:
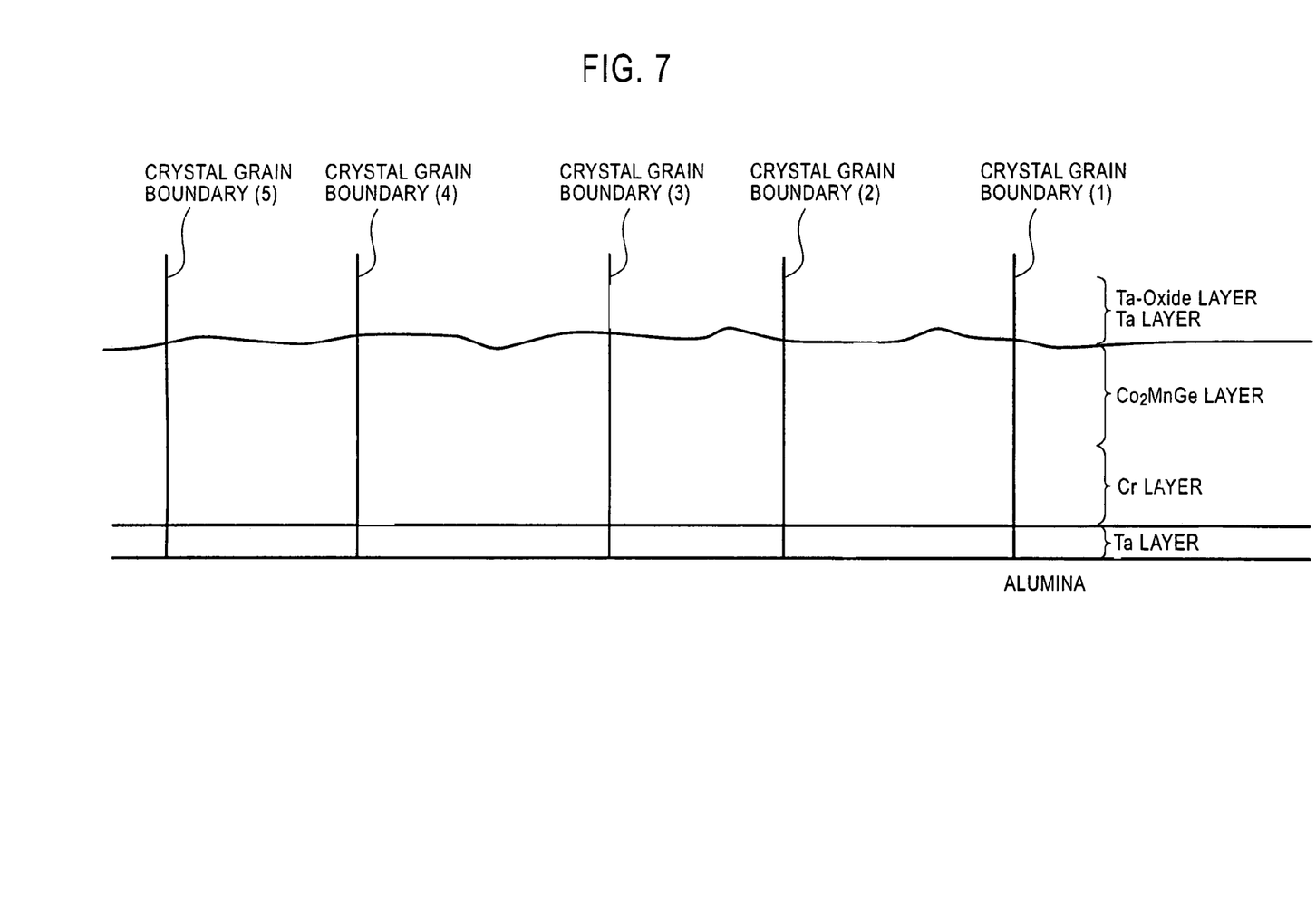
FIG. 7 is a partial schematic view of the transmission electron microscope image shown in FIG. 5.

FIG. 5 is a transmission electron microscope image (TEM image) of an example of the magnetic sensing element 100. FIG. 6 includes an enlarged view (the right side in the figure) of the portion surrounded by the frame in FIG. 5 and transmission electron diffraction patterns (the left side in the figure) of the base layer 111, the seed layer 112, and the free magnetic layer 113, wherein an electron beam is incident from the direction parallel to the interface between the seed layer 112 and the free magnetic layer 113. The transmission electron diffraction patterns of the base layer 111, the seed layer 112, and the free magnetic layer 113 shown in the left side in FIG. 6 show the portions surrounded by the circles in the enlarged view shown in the right side in the figure. FIG. 7 is a schematic view of the image shown in FIG. 5.

In FIGS. 5 to 7, a Ta layer, a Cr layer, a Co$_2$MnGe layer which is a Heusler alloy layer, and a Ta/Ta-Oxide layer correspond to the base layer 111, the seed layer 112, the free magnetic layer 113, and the protective layer 117, respectively. In the sample shown in FIGS. 5 to 7, the nonmagnetic layer 114 and the pinned magnetic layer 115 etc., which are disposed between the free magnetic layer 113 and the protective layer 117 in FIG. 1 are omitted.

In the present invention, as shown in FIGS. 5 to 7, crystal grain boundaries (1), (2), (3), (4), and (5) formed in the Cr layer (the seed layer 112) and the Co$_2$MnGe layer (the free magnetic layer 113) are continuous at the interface between the Cr layer (the seed layer 112) and the Co$_2$MnGe layer (the free magnetic layer 113) to form large crystal grains getting through the interface. When such a continuous crystal grain boundaries are formed, crystallographically equivalent axes lying in a crystal plane parallel to the surface of the Cr layer (the seed layer 112) and a crystal plane parallel to the surface of the Co$_2$MnGe layer (the free magnetic layer 113) are, at least partly, directed in the same direction at the interface.

When the interface between the seed layer 112 and the free magnetic layer 113 are crystallographically continuous in this manner, there is substantially no crystal grain boundary at the interface. Consequently, conduction electrons are not subjected to interface scattering, which is similar to the grain boundary scattering at the crystal grain boundary. This continuous state decreases the resistance and increases the ratio of change in resistance ($\Delta R/R$).

According to the present invention, in the seed layer 112 and the free magnetic layer 113, crystal planes equivalent with the [111] planes or the [220] planes are preferentially oriented in the direction parallel to the layer surfaces. In addition, crystal axes equivalent with <001> directions or <002> directions lying in the above crystal planes are, at least partly, directed in the same direction between the seed layer 112 and the free magnetic layer 113. In order to identify these crystal orientations, the seed layer 112 and the free magnetic layer 113 are analyzed by transmission electron diffractometry. The crystal orientations of the seed layer 112 and the free magnetic layer 113 can be identified from the following transmission electron diffraction patterns.

Figure 8:
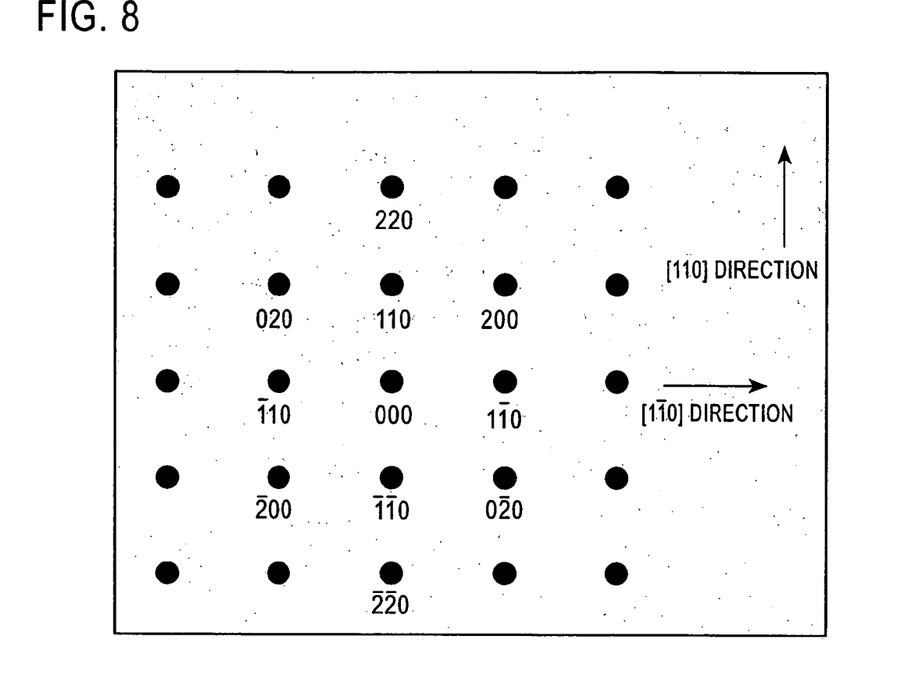
FIG. 8 is a schematic view of a transmission electron diffraction pattern of a seed layer in accordance with an embodiment of the present invention, analyzed from the direction parallel to the layer surface.
Figure 9:
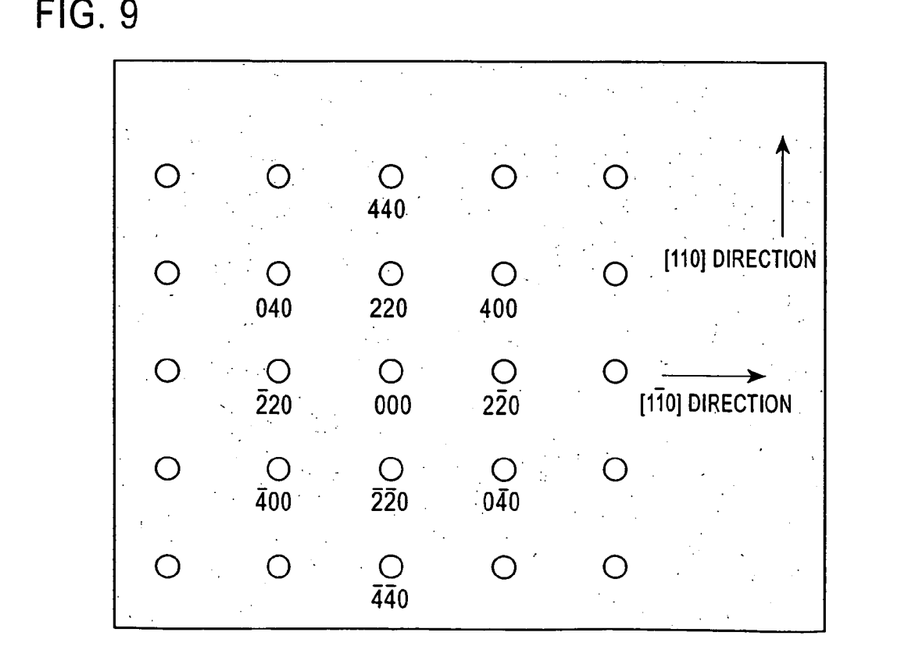
FIG. 9 is a schematic view of a transmission electron diffraction pattern of a free magnetic layer in accordance with an embodiment of the present invention, analyzed from the direction parallel to the layer surface.

FIG. 8 is a schematic view of the diffraction pattern of the seed layer 112 shown in FIG. 6. FIG. 9 is a schematic view of the diffraction pattern of the free magnetic layer 113 shown in FIG. 6.

The transmission electron diffraction patterns of the seed layer 112 and the free magnetic layer 113 show diffraction spots corresponding to reciprocal lattice points indicative of crystal planes of the layers. The reciprocal lattice points (i.e., diffraction spots) represent crystal planes represented in terms of Miller indices. Such reciprocal lattice planes, i.e., the projection planes of the electron diffraction pattern, are parallel to the crystal plane perpendicular to incident electron beam.

The seed layer 112 and the free magnetic layer 113 are composed of polycrystals. In the seed layer 112 and the free magnetic layer 113, the <110> direction of most of the crystal grains that form the layers is substantially perpendicular to the layer surfaces. On the other hand, for example, the <001> direction of the crystal grains is directed around 360° with respect to the direction perpendicular to the layer surface. Crystal grains having such various directions are mixed in the layers. Therefore, when an electron beam is incident on a certain crystal grain from the direction parallel to the layer surface, the result that which direction represented by the indices corresponds to the direction parallel to the electron beam, in other words, which crystal plane corresponds to the crystal plane perpendicular to the incident electron beam, depends on the target crystal grain. For example, the diffraction pattern shown in FIG. 8 (i.e., the diffraction pattern obtained from a certain crystal grain that forms the seed layer 112) shows a characteristic four-fold symmetric pattern. This pattern indicates that the incident electron beam is parallel to the [001] direction of the target crystal grain. In view of the symmetries, the diffraction spots are assigned to the indices shown in FIG. 8. Accordingly, the direction perpendicular to the layer surface (i.e., the upward direction in FIG. 8) corresponds to the <110> direction and the direction parallel to the interface (i.e., the rightward direction in FIG. 8) corresponds to the <1-10> direction.

FIG. 9 is an electron diffraction pattern in which an electron beam is incident on a crystal of the free magnetic layer 113. The crystal lies in the same columnar crystal including the above crystal of the seed layer 112 and is directly disposed on the crystal of the seed layer 112. The diffraction pattern shown in FIG. 9 is similar to that of the seed layer 112 shown in FIG. 8 and also shows a four-fold symmetric pattern. This pattern indicates that the direction of the incident electron beam is parallel to the <001> direction of the crystal of the free magnetic layer 113. In view of the symmetries, the diffraction spots are assigned to the indices shown in FIG. 9. Accordingly, the direction perpendicular to the layer surface (i.e., the upward direction in FIG. 9) corresponds to the <110> direction and the direction parallel to the interface (i.e., the rightward direction in FIG. 9) corresponds to the <1-10> direction. These orientation relationships are the same as those of the crystal of the seed layer 112 shown in FIG. 8. These patterns indicate that the crystal orientation relationships between the crystal of the seed layer 112 and the crystal of the free magnetic layer 113, which are adjacent in the same columnar crystal, are three-dimensionally equivalent.

In other words, in at least one columnar crystal, the crystal of the free magnetic layer 113 is matched with the crystal of the seed layer 112 to grow in an epitaxial state. This crystallographically continuous state can suppress interface scattering of conduction electrons. As a result, this continuous state decreases the resistance and can increase the ratio of change in resistance ($\Delta R/R$).

Second Embodiment

Figure 2:
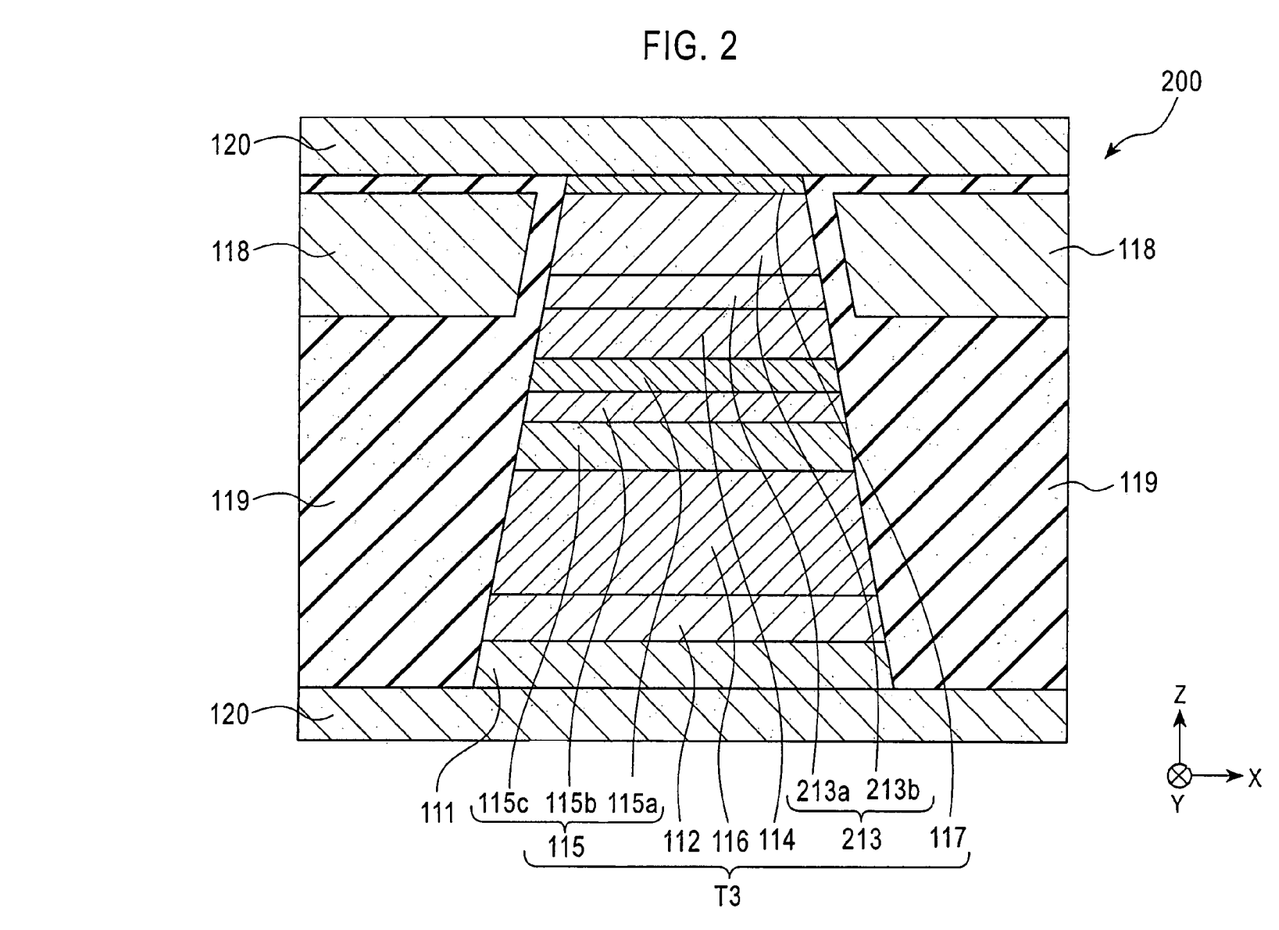
FIG. 2 is a cross-sectional view of a magnetic sensing element according to a second embodiment of the present invention, viewed from a surface facing a recording medium.

FIG. 2, which is similar to FIG. 1, is a cross-sectional view of a magnetic sensing element 200 according to a second embodiment of the present invention.

The magnetic sensing element 200 shown in FIG. 2 includes the same components as those in the magnetic sensing element 100 shown in FIG. 1. Therefore, in FIG. 2, the same components as in the magnetic sensing element 100 shown in FIG. 1 have the same reference numerals and the detailed description of the components is omitted.

Although the magnetic sensing element 200 shown in FIG. 2 includes the same components as those in the magnetic sensing element 100 shown in FIG. 1, the sequence of the deposition of a free magnetic layer 213, a nonmagnetic layer 114, a pinned magnetic layer 115 having a triple layer structure, and an antiferromagnetic layer 116, which are disposed on a seed layer 112 is different from that of the magnetic sensing element 100 shown in FIG. 1. Referring to FIG. 2, from the bottom, the antiferromagnetic layer 116, the pinned magnetic layer 115, the nonmagnetic layer 114, and the free magnetic layer 213 are sequentially deposited on the seed layer 112 to form a multilayer film T3. The magnetic sensing element 200 shown in FIG. 2 is a bottom spin-valve GMR magnetic sensing element in which the antiferromagnetic layer 116 is disposed under the pinned magnetic layer 115.

In the magnetic sensing element 200 shown in FIG. 2, the free magnetic layer 213 has a bilayer structure. This free magnetic layer 213 includes a third magnetic sublayer 213a and a fourth magnetic sublayer 213b disposed on the third magnetic sublayer 213a.

The third magnetic sublayer 213a has the bcc structure wherein equivalent crystal planes represented as [110] planes are preferentially oriented in the direction parallel to the surface of the multilayer film T3. The third magnetic sublayer 213a corresponds to the bcc layer of the present invention. The third magnetic sublayer 213a is composed of a FeCo alloy containing at least 30 atomic percent of iron, for example, $Fe_{50}CO_{50}$.

The fourth magnetic sublayer 213b is composed of a Heusler alloy and corresponds to the Heusler alloy layer of the present invention. The fourth magnetic sublayer 213b is composed of the same material as that of the free magnetic layer 113 forming the magnetic sensing element 100 shown in FIG. 1.

In the magnetic sensing element 200 shown in FIG. 2, the relationship between the third magnetic sublayer 213a and the fourth magnetic sublayer 213b is the same as the relationship between the seed layer 112 and the free magnetic layer 113 in the magnetic sensing element 100 shown in FIG. 1. In the magnetic sensing element 200 shown in FIG. 2, the special advantages described above can be achieved as in the magnetic sensing element 100 shown in FIG. 1.

Third Embodiment

Figure 3:
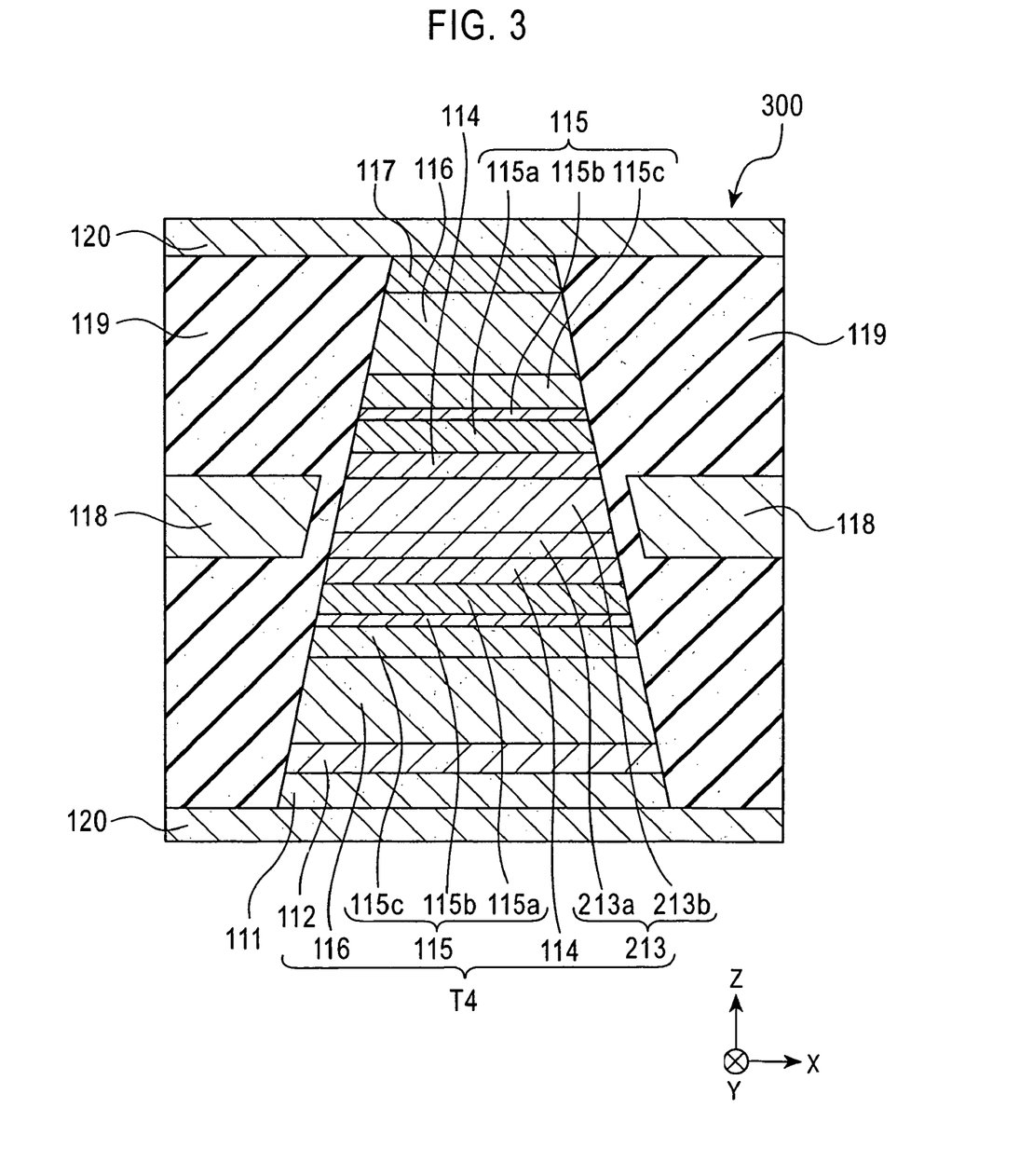
FIG. 3 is a cross-sectional view of a magnetic sensing element according to a third embodiment of the present invention, viewed from a surface facing a recording medium.

FIG. 3, which is similar to FIG. 1, is a cross-sectional view of a magnetic sensing element 300 according to a third embodiment of the present invention.

The magnetic sensing element 300 shown in FIG. 3 includes the same components as those in the magnetic sensing elements 100 and 200 shown in FIGS. 1 and 2, respectively. Therefore, in FIG. 3, the same components as in the magnetic sensing elements 100 and 200 shown in FIGS. 1 and 2, respectively, have the same reference numerals and the detailed description of the components is omitted.

In the magnetic sensing element 300 shown in FIG. 3, as in the magnetic sensing element 200 shown in FIG. 2, from the bottom, an antiferromagnetic layer 116, a pinned magnetic layer 115, a nonmagnetic layer 114, and a free magnetic layer 213 are sequentially deposited on a seed layer 112 to form a multilayer film T4. In addition, on the free magnetic layer 213, another nonmagnetic layer 114, another pinned magnetic layer 115 having a triple layer structure, another antiferromagnetic layer 116, and a protective layer 117 are sequentially deposited from the bottom. The magnetic sensing element 300 shown in FIG. 3 is a dual spin-valve GMR magnetic sensing element in which the antiferromagnetic layers 116 are disposed both above and below the free magnetic layer 213.

In the magnetic sensing element 300 shown in FIG. 3, as in the magnetic sensing element 200 shown in FIG. 2, the free magnetic layer 213 includes a third magnetic sublayer 213a and a fourth magnetic sublayer 213b.

The third magnetic sublayer 213a has the bcc structure wherein equivalent crystal planes represented as [110}] planes are preferentially oriented in the direction parallel to the surface of the multilayer film T4. The third magnetic sublayer 213a corresponds to the bcc layer of the present invention. The third magnetic sublayer 213a is composed of a FeCo alloy containing at least 30 atomic percent of iron, for example, $Fe_{50}CO_{50}$.

The fourth magnetic sublayer 213b is composed of a Heusler alloy and corresponds to the Heusler alloy layer of the present invention. The fourth magnetic sublayer 213b is composed of the same material as that of the free magnetic layer 113 forming the magnetic sensing element 100 shown in FIG. 1.

In the magnetic sensing element 300 shown in FIG. 3, the relationship between the third magnetic sublayer 213a and the fourth magnetic sublayer 213b is the same as the relationship between the seed layer 112 and the free magnetic layer 113 in the magnetic sensing element 100 shown in FIG. 1. In the magnetic sensing element 300 shown in FIG. 3, the special advantages described above can be achieved as in the magnetic sensing element 100 shown in FIG. 1.

In FIGS. 1 to 3, examples are described in which the free magnetic layer 113 or 213 corresponds to the Heusler alloy layer. However, the present invention is not limited to the above. For example, the second magnetic sublayer 115a which is in contact with the nonmagnetic layer 114 may be composed of the Heusler alloy. Both the second magnetic sublayer 115a which is in contact with the nonmagnetic layer 114 and the free magnetic layer 113 or 213 may be composed of the Heusler alloy. In these cases, the layers composed of the Heusler alloy must be formed on a layer having the bcc structure.

Although the present invention has been described with reference to preferable embodiments, the present invention can be modified as long as the modifications do not deviate from the scope of the invention. For example, the magnetic sensing element of the present invention may be a current perpendicular to the plane-tunnel magnetoresistive (CPP-TMR) magnetic sensing element.

The above embodiments are intended as examples only, and do not limit an aspect of the present invention.

EXAMPLE

CPP-GMR magnetic sensing elements (top spin-valves) having the following layer structures were formed. Values represented by resistance×area of element, i.e., ReA ($m\Omega\mu m^2$), amount of change in resistance×area of element, i.e., $\Delta RA$ ($m\Omega\mu m^2$), and the ratio of change in resistance, i.e., $\Delta R/Re$(%) were then measured.

Comparative Sample 1: base layer (Ta(30 Å))/seed layer (($Ni_{80}Fe_{20})_{60}Cr_{40}$(60 Å))/free magnetic layer ($Co_{90}Fe_{10}$(5 Å)/$Ni_{80}Fe_{20}$(90 Å)/$Co_{90}Fe_{10}$(5 Å))/nonmagnetic layer (Cu (43 Å))/pinned magnetic layer ($Co_{90}Fe_{10}$ (10 Å)/$Ni_{80}Fe_{20}$ (35 Å)/$Co_{90}Fe_{10}$(5 Å)/Ru(9 Å)/($Co_{90}Fe_{10}$(30 Å)/antiferromagnetic layer ($Pt_{50}Mn_{50}$(170 Å))/protective layer (Ta(30 Å))

Comparative Sample 2: base layer (Ta(30 Å))/free magnetic layer ($Co_2MnGe$(60 Å))/nonmagnetic layer (Cu(43

Å))/pinned magnetic layer (Co$_2$MnGe(40 Å)/(Co$_{90}$Fe$_{10}$(10 Å)/Ru(9 Å)/Co$_{90}$Fe$_{10}$(30 Å))/antiferromagnetic layer (Pt$_{50}$Mn$_{50}$(170 Å))/protective layer (Ta(30 Å))

Sample 1: base layer (Ta(30 Å))/seed layer (Cr(60 Å))/ free magnetic layer (Co$_2$MnGe(60 Å))/nonmagnetic layer (Cu(43 Å))/pinned magnetic layer (Co$_2$MnGe(40 Å)/CO$_{90}$Fe$_{10}$(10 Å)/Ru(9 Å)/(Co$_{90}$Fe$_{10}$(30 Å))/antiferromagnetic layer (Pt$_{50}$Mn$_{50}$(170 Å))/protective layer (Ta(30 Å))

Values in parentheses of the layers represent the layer thickness. In Sample 1, the sublayer in the pinned magnetic layer and the free magnetic layer were composed of Co$_2$MnGe and corresponded to the Heusler alloy layer. The free magnetic layer, i.e., the Heusler alloy layer composed of Co$_2$MnGe, was deposited on the seed layer composed of Cr, which was a bcc layer.

Table 1 shows the results.

TABLE 1

| | SV type | Pin 2 (Å) | Free (Å) | Base/Seed (Å) | ReA (mΩμm$^2$) | ΔRA (mΩμm$^2$) | ΔR/Re (%) |
|---|---|---|---|---|---|---|---|
| Comparative Sample 1 | Top | CO$_{90}$Fe$_{90}$(5)/ Ni$_{80}$Fe$_{20}$(90)/ CO$_{90}$Fe$_{10}$(5) | CO$_{90}$Fe$_{90}$(5)/ Ni$_{80}$Fe$_{20}$(90)/ CO$_{90}$Fe$_{10}$(5) | Ta(30)/NiFeCr(60) | 80 | 1.10 | 1.38 |
| Comparative Sample 2 | Top | Co$_2$MnGe(40)/ CO$_{90}$Fe$_{10}$(5) | CO$_2$MnGe(60) | Ta(30) | 95 | 0.14 | 0.15 |
| Sample 1 | Top | CO$_2$MnGe(40)/ CO$_{90}$Fe$_{10}$(5) | CO$_{90}$MnGe(60) | Ta(30)/Cr(60) | 85 | 3.70 | 4.35 |

In Comparative Sample 1, Comparative Sample 2, and Sample 1, the value represented by resistance×area of element ReA (mΩμm2) in the magnetic sensing elements was in the range of 80 to 95 mΩμm2. The use of the Heusler alloy Co$_2$MnGe as the free magnetic layer and the pinned magnetic layer increased the value of the resistance per unit area, i.e., ReA (mΩμm2).

Regarding the value represented by amount of change in resistance×area of element ΔRA (mΩμm2), there was a significant difference between the Comparative Samples 1 and 2, and Sample 1. In Sample 1, the Heusler alloy Co$_2$MnGe was used as the free magnetic layer and the pinned magnetic layer, and the free magnetic layer was deposited on the bcc layer (i.e., the seed layer composed of Cr). This layer structure provided the amount of change in resistance ΔRA (mΩμm2) more than three times as high as that of the magnetic sensing elements in the Comparative Samples 1 and 2.

In Sample 1, the value represented by amount of change in resistance×area of element ΔRA (mΩμm2) is high. As a result, the ratio of change in resistance ΔR/Re(%) was more than three times as high as that in the above Comparative Samples 1 and 2.

What is claimed is:

1. A magnetic sensing element comprising:
   a multilayer film comprising:
   at least one pinned magnetic layer in which the magnetization direction is pinned in one direction;
   a free magnetic layer; and
   at least one nonmagnetic layer disposed between the at least one pinned magnetic layer and the free magnetic layer,
   wherein a current flows in a direction perpendicular to a surface of the layers in the multilayer film, wherein at least one of the free magnetic layer and the pinned magnetic layer comprises a Heusler alloy layer,
   wherein the Heusler alloy layer has a body-centered cubic (bcc) structure, in which equivalent crystal planes represented as [220] planes are preferentially oriented in a direction parallel to the surface of the layers in the multilayer film, and
   wherein the Heusler alloy layer is disposed on a bcc layer having a body-centered cubic (bcc) structure, in which equivalent crystal planes represented as [110] planes are preferentially oriented in a direction parallel to a surface of the bcc layer.

2. The magnetic sensing element according to claim 1, wherein the bcc layer comprises a sublayer forming at least a part of the free magnetic layer.

3. The magnetic sensing element according to claim 1, wherein the bcc layer comprises a sublayer forming at least a part of the pinned magnetic layer.

4. The magnetic sensing element according to claim 1, wherein the bcc layer comprises a seed layer disposed under the free magnetic layer.

5. The magnetic sensing element according to claim 1, wherein the average grain size of the Heusler alloy layer in the direction parallel to the layer surface is at least about 50 Å.

6. The magnetic sensing element according to claim 1, wherein a columnar crystal is formed, in which a crystal grain boundary formed in the bcc layer, a crystal grain boundary appearing in a cut surface in a direction parallel to the thickness of the bcc layer, and a crystal grain boundary formed in the Heusler alloy layer are continuous.

7. The magnetic sensing element according to claim 6, wherein the crystals of the bcc layer in the columnar crystal are substantially matched with the crystals of the Heusler alloy layer in an epitaxial state.

8. The magnetic sensing element according to claim 6, wherein equivalent crystal axes lying in the [110] planes or the [220] planes of the columnar crystal are directed in substantially the same direction between the bcc layer and the Heusler alloy layer.

9. The magnetic sensing element according to claim 1, wherein the Heusler alloy layer comprises a metallic compound having a Heusler crystal structure and represented by a composition formula X2YZ or XYZ, wherein X is at least one element selected from the groups consisting of Cu, Co, Ni, Rh, Pt, Au, Pd, Ir, Ru, Ag, Zn, Cd, and Fe; Y is at least one element selected from the group consisting of Mn, Fe, Ti, V, Zr, Nb, Hf, Ta, Cr, Co, and Ni; and Z is at least one element selected from the group consisting Al, Sn, In, Sb, Ga, Si, Ge, Pb, and Zn.

10. The magnetic sensing element according to claim 1, wherein the Heusler alloy layer comprises a metallic compound represented by a composition formula X2MnZ, wherein X is at least one element selected from the group consisting of Cu, Co, Ni, Au, and Pd; and Z is at least one element selected from the group consisting of Al, Sn, In, Sb, Ga, Si, and Ge.

11. The magnetic sensing element according to claim 1, wherein the Heusler alloy layer comprises a metallic compound represented by a composition formula Co2MnZ, wherein Z is at least one element selected from the group consisting of Al, Sb, Si, and Ge.

12. The magnetic sensing element according to claim 1, wherein the multilayer film further comprises at least one antiferromagnetic layer, wherein the at least one pinned magnetic layer is formed in contact with the at least one antiferromagnetic layer, and the magnetization direction of the at least one pinned magnetic layer is pinned by the exchange anisotropic magnetic field with the at least one antiferromagnetic layer.

13. The magnetic sensing element according to claim 12, wherein at least one nonmagnetic layer comprises of first nonmagnetic layer and a second nonmagnetic layer and wherein the first nonmagnetic layer is disposed on the free magnetic layer, and the second nonmagnetic layer is disposed under the free magnetic layer, wherein the at least one pinned magnetic layer comprises a first pinned magnetic layer and a second pinned magnetic layer and wherein the first pinned magnetic layer is disposed on the first nonmagnetic layer, and the second pinned magnetic layer is disposed under the second nonmagnetic layer.

14. The magnetic sensing element according to claim 13, wherein the multilayer film further comprises a first antiferromagnetic layer disposed on the first pinned magnetic layer; and a second antiferromagnetic layer disposed under the second pinned magnetic layer, wherein the first and second antiferromagnetic layers pin the magnetization direction of each the first and second pinned magnetic layers in one direction by an exchange anisotropic magnetic field.

15. The magnetic sensing element according to claim 1, wherein the free magnetic layer comprises a first free magnetic layer and a second free magnetic layer, wherein one of the first and second magnetic layers comprises the Heusler alloy layer.

* * * * *